(12) United States Patent
Moreno Colom

(10) Patent No.: US 8,820,187 B2
(45) Date of Patent: Sep. 2, 2014

(54) SHIFTING DEVICE

(75) Inventor: Javier Moreno Colom, Malla (ES)

(73) Assignee: Fico Triad, S.A., Viladecavalls (ES)

( * ) Notice: Subject to any disclaimer, the term of this patent is extended or adjusted under 35 U.S.C. 154(b) by 79 days.

(21) Appl. No.: 13/451,466

(22) Filed: Apr. 19, 2012

(65) Prior Publication Data

US 2013/0074632 A1 Mar. 28, 2013

(30) Foreign Application Priority Data

Apr. 20, 2011 (EP) .................................. 11163144

(51) Int. Cl.
*B60K 20/00* (2006.01)
*G05G 5/00* (2006.01)

(52) U.S. Cl.
USPC ...................................................... 74/473.21

(58) Field of Classification Search
USPC ................. 74/473.21, 473.23, 473.24, 473.25
See application file for complete search history.

(56) References Cited

U.S. PATENT DOCUMENTS

| | | | |
|---|---|---|---|
| 4,986,143 A | | 1/1991 | Livshits et al. |
| 5,465,818 A | * | 11/1995 | Osborn et al. ............. 192/220.4 |
| 6,161,447 A | * | 12/2000 | Worner et al. ............. 74/473.21 |
| 6,298,742 B1 | * | 10/2001 | Ey ............................. 74/473.23 |
| 2002/0170376 A1 | | 11/2002 | Giefer et al. |
| 2010/0107800 A1 | * | 5/2010 | Sickart ....................... 74/473.23 |

FOREIGN PATENT DOCUMENTS

| | | |
|---|---|---|
| DE | 102007015262 A1 | 10/2008 |
| DE | 102008028619 A1 | 12/2009 |
| WO | 0108919 A1 | 2/2001 |
| WO | 2008106950 A1 | 9/2008 |

OTHER PUBLICATIONS

Extended European Search Report, European Application No. 11163144.6-2421, Filing Date Apr. 20, 2011, Date of Mailing Search Report Jul. 11, 2011, 4 pages.

* cited by examiner

*Primary Examiner* — Justin Krause
(74) *Attorney, Agent, or Firm* — Peter B. Scull; Hamilton, DeSanctis & Cha LLP

(57) ABSTRACT

A shifting device comprises a selector lever movable relative to a fixed part and selector lever lock for preventing the lever from being moved when in a locking position (P) in which a vehicle transmission is blocked. The lock comprises a slider coupled with lever configured to slide through the fixed part from the locking position (P) to an unlocking position (R, N, D) in which vehicle transmission is unblocked. The slider may comprise one or more stop such that the slider can only be displaced through the fixed part or otherwise allowed to be rotated about an axis for changing into any of the unlocking positions (R, N, D).

5 Claims, 4 Drawing Sheets

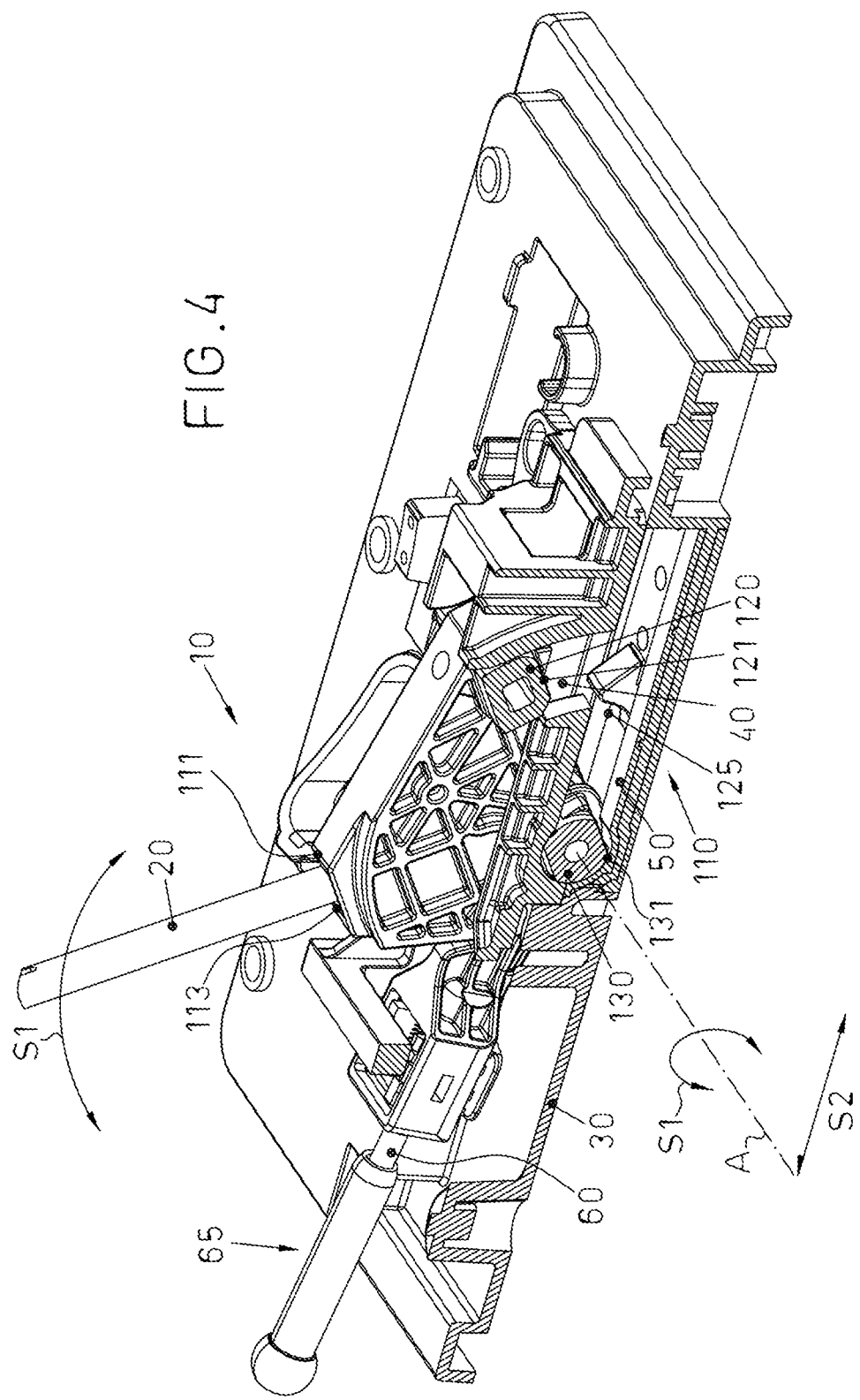

SHIFTING DEVICE

CROSS REFERENCE TO RELATED APPLICATION

The present application claims priority to European Application No. 11163144.6 filed 20 Apr. 2011. The entirety of the aforementioned application is incorporated herein by reference for all purposes.

TECHNICAL FIELD

Shifting devices are disclosed herein that can be used for transmissions of motor vehicles in which a parking position can be activated.

BACKGROUND

Shift by wire shifting devices with mechanical parking engagement at a position in which vehicle transmission is blocked (Park position, or P position) require the provision of a mechanism to lock the gearshift at said position in order to block the vehicle transmission when parked and not to transmit any movement to the brake cable when the gearshift lever is operated in the rest of the unblocked transmission gearshift positions (Reverse, Neutral, Drive positions, or R, N, D positions).

In this respect, shifting devices for motor vehicles are known in the art comprising a selector lever that can be moved relative to a fixed part, such as a shift gate, for shifting between the P position and the other R, N, D operating positions. Some known shifting devices are provided with a selector lever lock for preventing the gearshift lever to be moved when in said P position in which the vehicle transmission is blocked.

One example of a lock for the gearshift lever comprises a detent mechanism for releasably coupling the shift lever and a detent plate attached on the shift gate. The detent mechanism is manually released from the detent plate and the shift lever so that the shift lever can be repositioned.

A further example of such a lock includes a locking lever that is pivotally disposed relative to the detent plate and connected to the vehicle ignition lock mechanism for pivotal movement to a locking position relative to the detent mechanism. This prevents release of the shift lever when the ignition lock mechanism is actuated to the locking position with the shift lever in the P position. Such an example is disclosed, for example, in US2002170376 in which means for mechanical coupling between the gearshift lever and the automatic transmission are provided. The P position can be then released in case of power failure. In this document, the locking device comprises an electromagnetic unlocking device. This unlocking device acts on a lever arm against the strength of a spring. The lever arm has a hook at one free end thereof for locking the gearshift lever when in the P position allowing gearshift release when electromagnetic unlocking device is powered, for example when ignition is turned on, such that it can be moved into all the operating positions.

WO2008106950 shows a further example of a gearshift lever lock for locking the selector lever in the P position. An electromagnetic actuator is provided that is activated when the user operates a push button in the selector lever. This makes a locking rocker to be disengaged from gearshift lever such that it can be moved out of the P position into one of said operating positions.

Although prior art systems are effective, they are bulky, complex, expensive and noisy when in use.

SUMMARY

A shifting device is disclosed herein. The present shifting device is particularly suitable for shift by wire gearshift devices with mechanical parking connection and with electronic detection of all positions. Other possible applications are not however ruled out. Through the present shifting device, the above disadvantages are overcome and further advantages are achieved.

The present shifting device comprises a selector lever that is mounted on a fixed part such as a shift gate in a way that it can be moved relative to it by a user. The selector lever of the present shifting device can be movably mounted on any fixed part of the vehicle, that is, any parts fixed, e.g. to the frame, such that in can be moved relative thereto as a gear shifting operation is being carried out by the user.

The present shifting device further comprises a selector lever lock for preventing the gearshift lever to be moved when in a locking position. This locking position may be, for example, a position where the vehicle transmission is blocked for preventing the wheels of the vehicle to be rotated, for example in a Park locking position (P position hereinbelow) in which the vehicle transmission is blocked in a way that the wheels of the vehicle are not allowed to be rotated, for example when the vehicle is parked.

The lever lock of the present shifting device comprises a slider. The slider as used herein stands for a movable part that can be made, for example, of a thermoplastic material or any other material suitable for sliding through another part. This movable part is designed for sliding through a vehicle fixed part (e.g. a shift gate or any other fixed part of the vehicle) when actuated by the user. The sliding of causes the slider to be displaced from a locking position (P position) in which vehicle transmission is blocked (wheels are not allowed to be rotated), to an unlocking position (R, N, D positions) in which the vehicle transmission is unblocked (wheels allowed to be rotated), and vice versa. The sliding movement of the slider through the fixed part is assisted by a guide provided in the fixed part.

The slider is coupled to the gearshift lever such that a rotation movement of the gearshift lever to the fixed part when shifting operations are carried out by a user results in the slider to be moved between said all the P, R, N, D gearshifting positions as well as between the vehicle transmission blocking/unblocking positions.

In some embodiments, the slider comprises at least a first stop (which purpose will be explained hereinbelow), such that:

in a locking position (P position, vehicle wheels not allowed to be rotated), the first stop are suitably received within a first receiving portion formed in the fixed part in a way that the slider can only be displaced, and in an unlocking position (any of the R, N, D operating positions), the first stop are driven out of the first receiving portion of the fixed part in a way that the slider is allowed to be rotated around an axis enabling the gearshift lever to be moved to any of the R, N, D operating positions.

In some embodiments, the slider comprises first and second stops such that:

in the locking position the first stop of the slider is received within a first receiving portion of the fixed part and the second stop of the slider is received within a second receiving portion of the fixed part. Such an arrangement of the first and the second stops causes the slider to be capable of only being displaced through the fixed part; and in the unlocking position, the first stop of the slider is driven out of the first receiving portion of the fixed part. This arrangement causes the slider to be capable of being rotated around an axis, enabling the gearshift lever (and therefore, the slider) to be rotated for shifting into operating gearshift positions (i.e. into any of the R, N, D positions).

The fixed part may comprise a channel that is properly sized such that a portion of the slider (e.g. one of said stops, for example the first stop) is allowed to run therethrough as the gearshift lever is being operated into any of said operating positions.

The present gearshift device may further comprise a device for driving a parking cable when the gearshift lever is being operated into the locking position (P position) in which vehicle transmission is blocked, i.e. when the vehicle is parked (wheels not allowed to be rotated).

The position in which the vehicle transmission is unblocked (wheels allowed to be rotated), that is, a position other than said P position, i.e. any of the R, N, D positions, the gearshift lever is allowed to be moved for gear shifting in a way that it is not acting on a park brake such as for example, a parking cable. The park brake may be then actuated through the handbrake or through the present gearshift device.

The provision of the above disclosed selector lever lock in the present shifter device allows the cable kinematics and packaging restrictions to be overcome through the use of a simple arrangement comprising few parts thus simplifying the design and validation of the shifter. On the other hand, the use of a guided slider makes the engage and disengage operations to be simpler with an arrangement that can be adapted to any motor vehicle shifter device due to its simplicity and small overall size.

BRIEF DESCRIPTION OF THE DRAWINGS

A particular embodiment of the present shifting device will be described in the following, only by way of non-limiting example, with reference to the appended drawings, in which:

FIG. 4 is a perspective view of the embodiment of the shifting device in FIG. 1 with some parts removed for clarity and in which the device has been shown in a neutral or drive (N or D) gearshift position in which the vehicle transmission is unblocked.

DETAILED DESCRIPTION OF PARTICULAR EMBODIMENTS

According to the drawings, one embodiment of a shifting device in a shift by wire gearshift device is shown and denoted generally at 10 in FIGS. 1-4. The shifting device 10 of the embodiment shown comprises a standard selector lever 20 comprising an elongated shaft having an upper and a lower end. For the sake of clarity, the elongated shaft has been shown without the knob at the upper end thereof. The lower end of the shaft is adapted to be mounted on a movable part (slider). This allows the selector lever 20 to be movably mounted to a given fixed part 30 of the vehicle, such as a shift gate. Selector lever 20 can be movably mounted to any other suitable parts of the vehicle as long as they are fixed to the vehicle.

The selector lever 20 of the shifting device 10 can be rotated to the fixed part 30 around a transverse axis A according to line S1 shown in FIGS. 1-4. The selector lever 20 of the shifting device 10 is also capable of being displaced through the fixed part 30 according to line S2 shown in FIGS. 1-4 as it will be fully explained below. Rotational and translational movements S1, S2 of the selector lever 20 allow engagement/disengagement operations of a parking cable 60 to be performed as it will be fully explained below. The parking cable 60 may be then actuated through the vehicle handbrake or through the present gearshift device 10.

Figure 1:
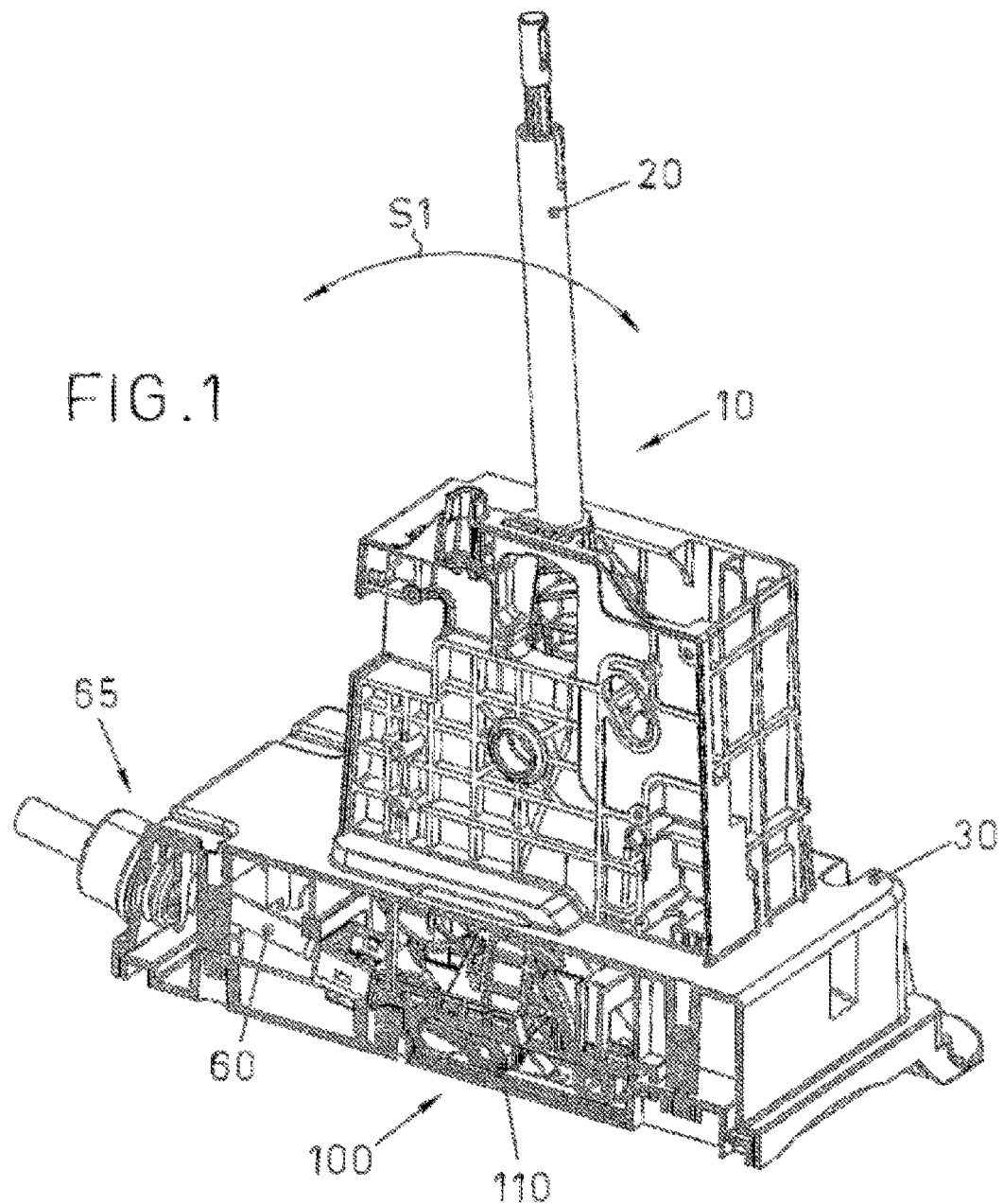
FIG. 1 is a perspective view of one embodiment of the present shifting device.
Figure 2:
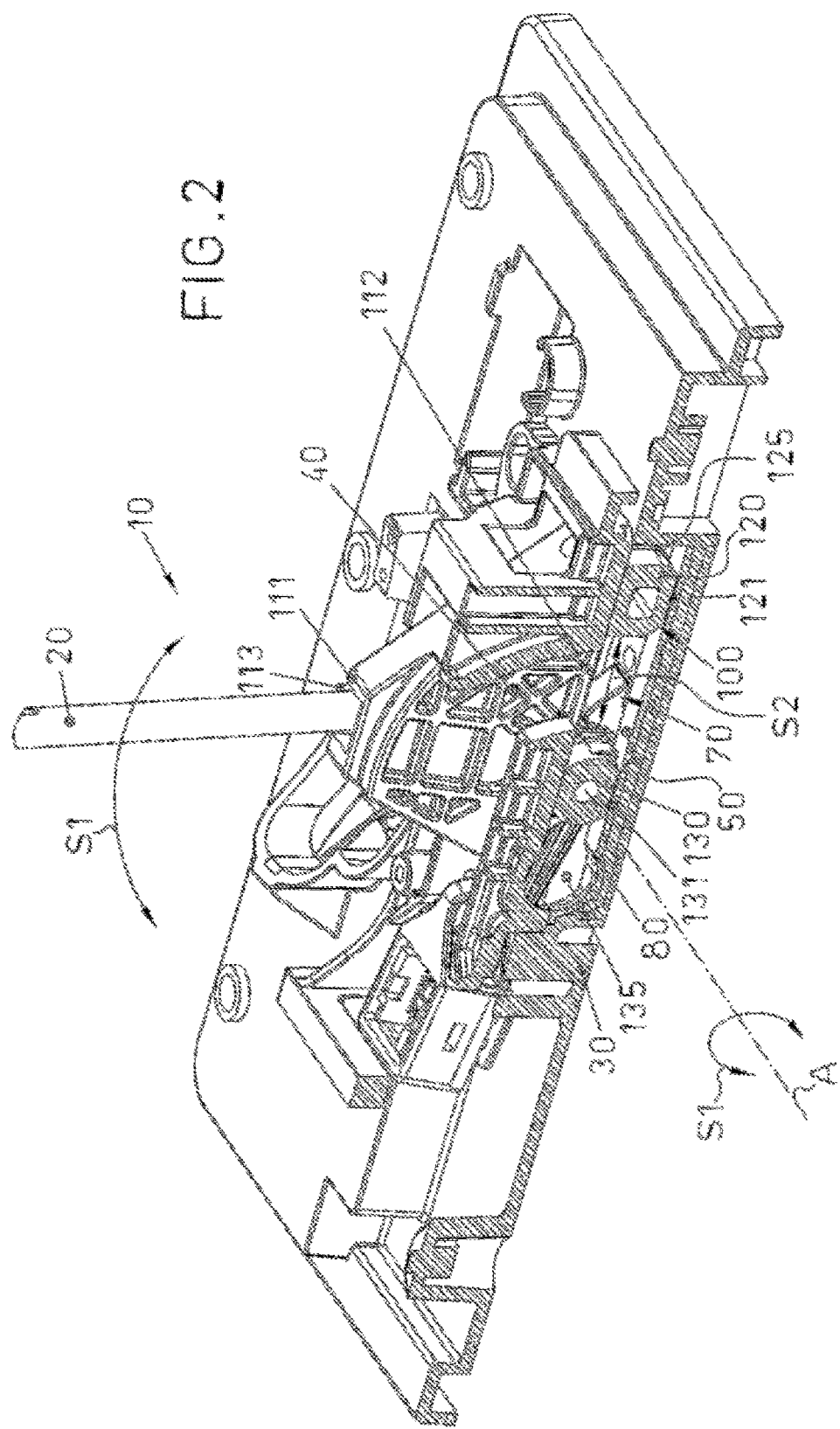
FIG. 2 is a perspective view of the embodiment of the shifting device in FIG. 1 with some parts removed for clarity and in which the device has been shown in a locking position (P position) in which the vehicle transmission is blocked.

Selector lever lock 100 is provided for preventing the gearshift lever 20 to be moved, i.e. rotated through an angle around shaft A in any of the directions according to line S1 when in the P gearshift position in which vehicle transmission is blocked as shown in FIG. 2 (wheels not allowed to be rotated).

The lever lock 100 comprise a slider 110 that may be made, for example, of a thermoplastic material, or other suitable injected materials, with or without fillers, friction reduction or stiffness additives, die casting materials, etc. The slider 110 is shaped in the form of a frustum of a substantially rectangular pyramid, although other shapes are of course possible as long as they are suitable both for receiving the shaft of the gearshift lever 20 and for sliding through the fixed part 30 of the shifting device 10.

In the embodiment shown, the frustum of the slider 110 comprises a top surface 111 and a bottom surface 112. The frustum top surface 111 is provided with a recess 113 formed therein for fixedly receiving a lower portion of the shaft of the gearshift lever 20. The attachment of shaft of the lever 20 into the recess 113 in the top surface 111 of the slider 110 results in that the slider 110 and the lever 20 can be rotated together relative to the fixed part 30 around transverse axis A according to line S1 and displaced through the fixed part 30 according to line S2 for allowing engagement/disengagement operations of the parking cable 60 as it will be fully explained below.

Figure 3:
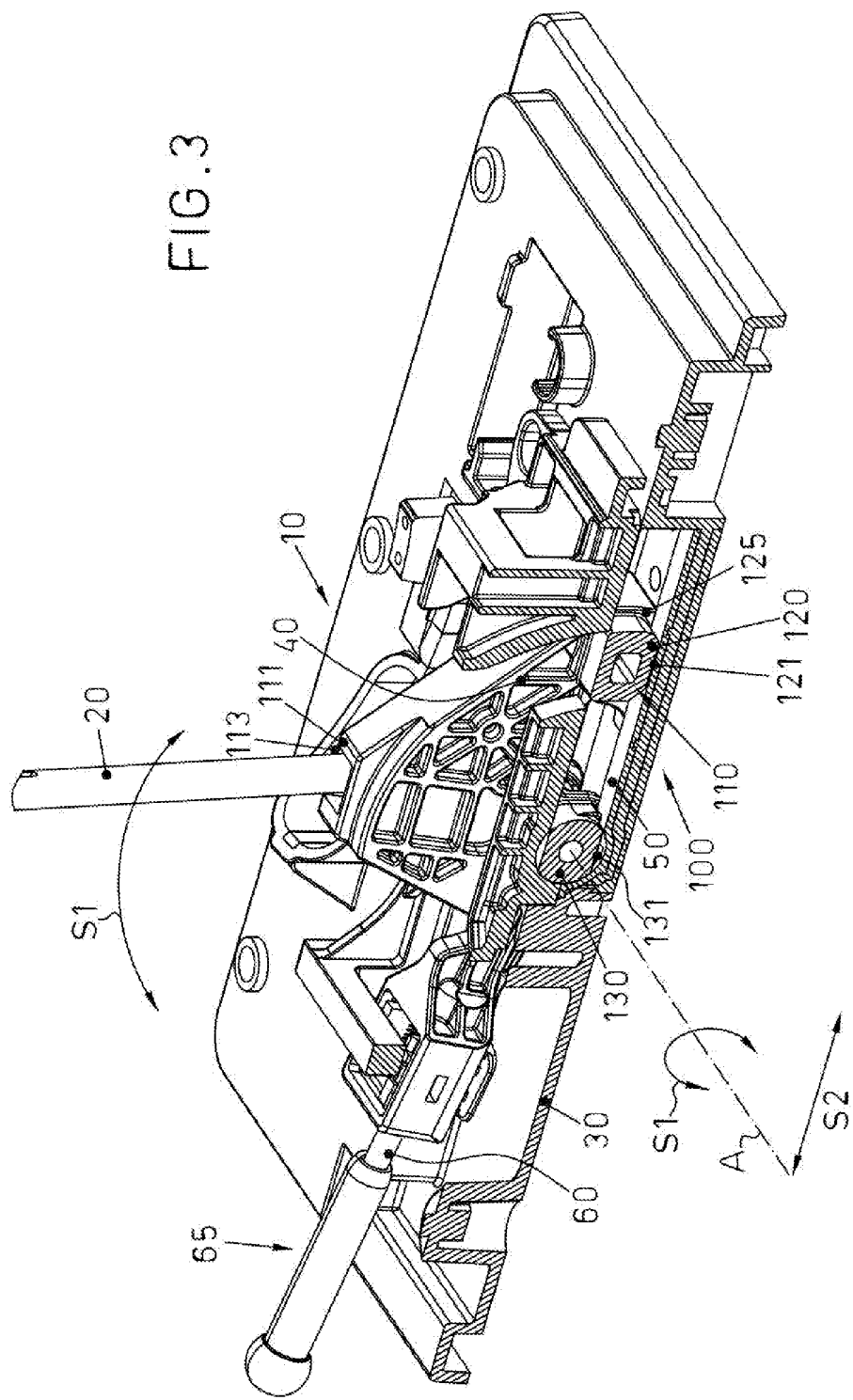
FIG. 3 is a perspective view of the embodiment of the shifting device in FIG. 1 with some parts removed for clarity and in which the device has been shown in a reverse (R) gearshift position in which the vehicle transmission is unblocked.

The slider 110 is designed such that it can be slidingly driven through the fixed part 30, as shown by arrow S2, on a sliding surface 50 formed inside the fixed part 30. As explained above, when operated by the user through the selector lever 20, the slider 110 is capable of performing a rotational movement S1 and a translational movement S2. More particularly, the slider 110 can perform a sliding translational movement along line S2 from the P position, in which vehicle transmission is blocked (wheels not allowed to be rotated) as shown in FIG. 2, into a vehicle unlocking position (that is, any one of the Reverse, Neutral, and Drive [R, N, D] positions as shown in FIGS. 3-4) in which the vehicle transmission is unblocked (wheels allowed to be rotated), and vice versa. The gearshift operating positions R, N, D can be selected through the rotational movement of the lever 20 (together with the slider 110) around transverse axis A in the directions according to line S1.

The frustum bottom surface 112 of the slider 110 has first and second stops 120, 130. The stops 120, 130, in the example shown, comprises projecting members having a lower, straight sliding surface 121, 131 that is in sliding contact with the sliding surface 50 of the fixed part 30. The sliding surface 50 may be made of any suitable low friction molded material.

Guides 70, 80 are further provided. The guides may comprise translational guides 70 for ensuring a suitable sliding translation of the slider 110 on the sliding surface 50 within the fixed part 30. The sliding surface 50 is a part of the translational guide 70. The guide may further comprise a rotational guide 80 for ensuring a suitable rotation of the slider 110 around transverse axis A when in the second receiving portion 135 of the fixed part 30. The rotational guide 80 is formed by the rounded cavity formed in the second receiving portion 135 such that the second stop 130 is guided when it is being rotated according to line S1 about axis A within the second receiving portion 135.

The first stop 120 is shaped substantially in the form a prism having substantially rounded edges and the aforedescribed lower, straight sliding surface 121 for proper sliding of the slider 110 on the sliding surface 50 within the fixed part 30. The second stop 130 is shaped substantially in the form a cylinder with the aforedescribed lower, straight sliding surface 131 for proper sliding on the sliding surface 50 within the fixed part 30. The cylindrical shape of the second stop 130 is particularly suitable for rotation of the lever and slider assembly 20, 110 (that is, the assembly defined by the selector lever 20 and the slider 110) about axis A according to line S1 in gear shifting operations.

Operation of the shifting device 10 of the embodiment described in connection with the drawings is as follows. From a P position (vehicle transmission blocked, wheels not allowed to be rotated) as shown in FIG. 2, the first stop 120 is received within a first receiving portion 125 (rightmost portion in FIG. 2) formed in the fixed part 30. With the first stop 120 within said first receiving portion 125, the lever and slider assembly 20, 110 is not allowed to be rotated about axis A, according to line S1, as the upper surface of the first stop 120 is abutting the inner surface of the first receiving portion 125. The upper surface of the second stop 130 is also abutting the inner surface of a second receiving portion 135 formed in the interior of the fixed part 30. As a result, the lever and slider assembly 20, 110 is only allowed to be displaced through the inside of the fixed part 30, along sliding surface 50 (line S2) providing the required travel to the parking release push-pull cable 60 (shown in FIG. 1) to block/unblock the vehicle transmission. The parking cable 60 is a part of a parking release mechanism 65. One end of the parking release push-pull cable 60 is linked to the slider 110 with a pin system (not shown) that permits the pivot movement of said parking cable end. As the lever and slider assembly 20, 110 is not allowed to be rotated in this condition, no shifting operations can be performed and therefore the user can not shift to the other reverse, neutral, drive (R, N, D) positions.

FIGS. 3 and 4 show the present shifting device 10 in a shift by wire gearshift device in operating reverse, neutral and drive (R, N, D) positions in which the vehicle transmission is unblocked, that is, the vehicle wheels are allowed to be rotated. In any of these operating positions (R, N, D), the first stop 120 is driven out of the first receiving portion 125 of the fixed part 30, that is, to the left side in figs. As the first stop 120 is fully out of the first receiving portion 125 of the fixed part 30 the first stop 120 is allowed to enter a curved channel 40 formed in the fixed part 30 as shown in FIG. 3 (lever and slider assembly 20, 110 in position R) and the second stop 130 is driven into the second receiving portion 135 of the fixed part 30. When the second stop 130 has been fully received into the second receiving portion 135 of the fixed part 30 (FIGS. 3 and 4) the rotational guide 80 hampers the second stop 130 to get out from the receiving portion 135 ensuring that the lever and slider assembly 20, 110 can be suitably rotated on axis A in said receiving portion 135 of the fixed part 30.

With the slider 110 having the second stop 130 fitted into the second receiving portion 135 of the fixed part 30 and allowed to be rotated about axis A no movement is transmitted to the parking cable 60 when the lever 20 is operated to the neutral (N) or the drive (D) positions as shown in FIG. 4 in which the vehicle transmission is unblocked (wheels free to rotate).

Although not shown in the drawings, the present shifting device may be provided with a dampener to prevent or reduce any abnormal noise inside the vehicle during gear shifting operations.

On the other hand, although the embodiment of the shifting device that has been described in conjunction with the figures is for use in shift by wire gearshift devices, the present shifting device of course is suitable for any other type of shifter devices. It can even be used in general in applications where a cable transmission is required, such as parking engagement and position detection devices, and the like.

The invention claimed is:

1. A shifting device for motor vehicles comprising a selector lever mounted such that the selector lever can be moved relative to a fixed part of the vehicle and a selector lever lock for preventing the gearshift lever from being moved when in a locking position (P), wherein the selector lever lock comprises a slider coupled with the gearshift lever and is configured to be driven through the fixed part from said locking position (P) to one of a plurality of operating unlocking positions (R, N, D) and vice versa;

wherein the slider comprises first and second stops each comprising respective projecting members each having a lower, straight sliding surface that is in sliding contact with the fixed part, configured such that in the locking position (P) the first stop is received within a first receiving portion formed in the fixed part and the second stop is received within a second receiving portion formed in the fixed part, such that the slider can only be displaced through the fixed part; and such that in one of the plurality of operating unlocking positions (R, N, D) the first stop is driven out of the first receiving portion of the fixed part such that the slider is allowed to be rotated about an axis enabling the gearshift lever to be moved to any one of the plurality of operating unlocking positions (R, N, D).

2. The device of claim 1 further comprising a device configured to drive a parking cable when the gearshift lever is being operated into said locking position (P) for blocking the vehicle transmission.

3. The device of claim 1, wherein said fixed part comprises a channel through which a portion of the slider is configured to run as the gearshift lever is being operated into any one of the plurality of operating unlocking positions (R, N, D).

4. The device of claim 1, wherein the fixed part comprises a guide configured to guide the slider as it is moved in the fixed part.

5. The device of claim 1, wherein the slider is made of a thermoplastic material suitable for sliding through the fixed part.

* * * * *